United States Patent
Panosyan et al.

(10) Patent No.: US 9,413,217 B2
(45) Date of Patent: Aug. 9, 2016

(54) ELECTROMAGNETIC BRAKING SYSTEMS AND METHODS

(75) Inventors: Ara Panosyan, Munich (DE); Simon Herbert Schramm, Munich (DE); Jan Erich Hemmelmann, Munich (DE); Christof Martin Sihler, Hallbergmoos (DE); Francesco Papini, Munich (DE); Xiaoting Dong, Munich (DE); Johannes Huber, Kramsach (AT)

(73) Assignee: General Electric Company, Niskayuna, NY (US)

( * ) Notice: Subject to any disclaimer, the term of this patent is extended or adjusted under 35 U.S.C. 154(b) by 314 days.

(21) Appl. No.: 13/536,245

(22) Filed: Jun. 28, 2012

(65) Prior Publication Data

US 2014/0001756 A1 Jan. 2, 2014

(51) Int. Cl.
*B60T 11/10* (2006.01)
*H02K 49/04* (2006.01)
*F03D 7/02* (2006.01)
*H02P 3/04* (2006.01)
*H02P 9/06* (2006.01)
*F16D 121/20* (2012.01)

(52) U.S. Cl.
CPC ............ *H02K 49/046* (2013.01); *F03D 7/0244* (2013.01); *F03D 7/0272* (2013.01); *H02P 3/04* (2013.01); *H02P 9/06* (2013.01); *F16D 2121/20* (2013.01); *Y02E 10/723* (2013.01); *Y02E 10/725* (2013.01)

(58) Field of Classification Search
CPC ........... H02K 49/046; H02P 3/04; H02P 9/06; F16D 2121/20; F03D 7/0244; F03D 7/0272; Y02E 10/723; Y02E 10/725

USPC ................. 188/155–158, 159, 160, 162–165; 700/286, 287, 288; 322/44, 45, 47, 51, 322/52, 59, 89
See application file for complete search history.

(56) References Cited

U.S. PATENT DOCUMENTS

| 5,485,901 | A | | 1/1996 | Akima et al. |
| 5,685,398 | A | | 11/1997 | Marshall et al. |
| 5,821,712 | A | | 10/1998 | Fittje |
| 6,149,544 | A | * | 11/2000 | Masberg et al. ................. 477/13 |

(Continued)

FOREIGN PATENT DOCUMENTS

| CN | 102709944 A | 10/2012 |
| CN | 202685972 U | 1/2013 |

(Continued)

OTHER PUBLICATIONS

N. A. Antipova; "Power Systems and Electric Networks"; The Use of an Electromagnetic Brake to Improve the Dynamic Stability of a Power System; vol. 46, No. 1, May 2012; pp. 75-80.

(Continued)

*Primary Examiner* — Pamela Rodriguez
(74) *Attorney, Agent, or Firm* — Ann M. Agosti

(57) ABSTRACT

An electromagnetic braking system of a power generation system includes an electrically conductive disc coupled to a rotatable shaft operatively coupled between a prime mover and a generator; a controller for receiving a status signal from the power generation system and for generating a control signal based on the status signal; and an inducting unit for applying an electromagnetic braking force on the electrically conductive disc when commanded by the control signal to regulate a rotational speed of the rotatable shaft.

3 Claims, 5 Drawing Sheets

(56) References Cited

U.S. PATENT DOCUMENTS

| | | |
|---|---|---|
| 6,253,885 B1 | 7/2001 | Tsai et al. |
| 6,425,838 B1 | 7/2002 | Matsubara et al. |
| 6,460,828 B1 | 10/2002 | Gersemsky et al. |
| 6,619,760 B1 | 9/2003 | Anwar |
| 6,702,404 B2 * | 3/2004 | Anwar et al. ............ 303/152 |
| 6,731,034 B1 | 5/2004 | Habele et al. |
| 7,173,399 B2 | 2/2007 | Sihler et al. |
| 7,395,888 B2 | 7/2008 | Yamamoto et al. |
| 7,944,067 B2 | 5/2011 | Kammer et al. |
| 7,976,434 B2 | 7/2011 | Radow et al. |
| 8,021,112 B2 | 9/2011 | Dinjus et al. |
| 8,265,843 B2 | 9/2012 | Hornbrook et al. |
| 8,299,735 B2 | 10/2012 | Horng et al. |
| 8,428,840 B2 | 4/2013 | O'Dea et al. |
| 8,471,534 B2 * | 6/2013 | Panosyan et al. ............ 322/7 |
| 8,540,324 B2 | 9/2013 | Leiber et al. |
| 8,786,997 B2 | 7/2014 | Maruno et al. |
| 8,994,201 B2 * | 3/2015 | Farley ............................ 290/44 |
| 2002/0170791 A1 | 11/2002 | Saito et al. |
| 2004/0070269 A1 | 4/2004 | Anwar et al. |
| 2005/0205712 A1 | 9/2005 | Aisenbrey |
| 2007/0210584 A1 | 9/2007 | Stahlhut et al. |
| 2010/0134062 A1 | 6/2010 | Knoedgen |
| 2010/0241283 A1 | 9/2010 | Desai et al. |
| 2012/0104754 A1 | 5/2012 | Rudolf et al. |
| 2012/0201657 A1 | 8/2012 | Donnelly et al. |
| 2012/0330522 A1 | 12/2012 | Gibson et al. |
| 2013/0015026 A1 | 1/2013 | Li et al. |
| 2013/0306389 A1 | 11/2013 | Penev |
| 2014/0001756 A1 | 1/2014 | Panosyan et al. |
| 2014/0015506 A1 | 1/2014 | Hsiao et al. |
| 2015/0061298 A1 | 3/2015 | Panosyan et al. |
| 2015/0194913 A1 | 7/2015 | Hessler et al. |
| 2015/0217660 A1 | 8/2015 | Manabe et al. |

FOREIGN PATENT DOCUMENTS

| | | |
|---|---|---|
| CN | 103089857 A | 5/2013 |
| GB | 444854 A | 3/1936 |
| JP | 60167602 A | 8/1985 |
| JP | 2011190918 A | 9/2011 |
| WO | 8808636 A1 | 11/1988 |
| WO | 2009011615 A1 | 1/2009 |

OTHER PUBLICATIONS

Adly, A.A et al., "Speed-Range-Based Optimization of Nonlinear Electromagnetic Braking Systems", Magnetics, IEEE Transactions, Issue Date: Jun. 2007, vol. 43, Issue:6, on pp. 2606-2608, ISSN: 0018-9464.

Bryanston-Cross et al., "Whole-Field Visualisation And Velocity Measurement Of An Instantaneous Transonic Turbine Flow", Instrumentation in Aerospace Simulation Facilities, ICIASF '97 Record., International Congress on, IEEE, Conference Location Pacific Grove, CA, pp. 278-286, 1997.

Qian et al., "Modeling And Control Of Electromagnetic Brakes For Enhanced Braking Capabilities For Automated Highway Systems", Intelligent Transportation System, ITSC, IEEE Conference, Conference Location Boston, MA, pp. 391-396, Nov. 9-12, 1997.

Gosline et al., "On The Use of Eddy Current Brakes as Tunable, Fast Turn-On Viscous Dampers For Haptic Rendering", Proc. Eurohaptics, pp. 229-234, 2006.

"Eddy Current & AC DYNO mite Absorbers", Land & Sea, pp. 1-2, Mar. 14, 2009.

Alsaihati, "Simulation And Economic Analysis of a Hybrid Wind Diesel System For Remote Area Power Supply", IMEPE, Aug. 23, 2010.

Karakoc, "Modeling and Design Optimization of Electromechanical Brake Actuator Using Eddy Currents", pp. 1-153, 2012.

Stefan Schroeder et al., U.S. Appl. No. 14/339,552, filed Jul. 24, 2014.

Ara Panosyan et al., U.S. Appl. No. 14/566,145, filed Dec. 10, 2014.

Ara Panosyan et al., U.S. Appl. No. 14/540,536, filed Nov. 13, 2014.

US First Action Interview-Office Action issued in connection with corresponding U.S. Appl. No. 14/339,552 on Dec. 21, 2015.

European Search Report and Opinion issued in connection with corresponding EP Application No. 15177889.1 on Jan. 21, 2016.

* cited by examiner

ELECTROMAGNETIC BRAKING SYSTEMS AND METHODS

BACKGROUND

The disclosure relates generally to a power generation system and more specifically to systems and methods for maintaining synchronism between a power generator and a power grid in the power generation system.

Distributed energy resource (DER) systems are small power generators, typically in a range from 3 kW to 10,000 kW, that generate power from various sources and transfer the generated power to a power grid connected to the power generators. The power grid collects the power generated from multiple power generators and transmits the power to different locations. Typically, the DER systems are an alternative to or an enhancement of traditional electric power systems. Small power generators may be powered by small gas turbines or may include fuel cells and/or wind powered generators, for example. The DER systems reduce the amount of energy lost in transmitting electricity because the electricity is generated very close to where it is used, perhaps even in the same building. DER systems also reduce the size and number of power lines that must be constructed.

Until recently, network operators in many countries allowed small distributed generators to quickly disconnect from the network in case of severe network disturbances. Network disturbances may be due to several kinds of faults that occur during operation of the DER systems. Typically, the faults in electric power grids may be either balanced faults or unbalanced faults. In practice, most of the faults in power systems are unbalanced single phase faults. When a fault in the utility system occurs, voltage in the system may decrease by a certain amount. Such decreases in the voltage may be referred to as "voltage dips" or "voltage sags."

The characteristics of such "voltage dips" or "voltage sags" depend on several aspects, such as type and severity of the fault, location of the fault, and duration of the fault. Typically, the magnitude of the "voltage dip" or "voltage sag" at any location in the power grid may depend on the severity of the fault and the distance to the fault. Similarly, the duration of the "voltage dip" or "voltage sag" may depend on the time required for the protective circuits to detect and isolate the fault. The duration of the "voltage dip" or "voltage sag" may be usually of the order of a few hundred milliseconds.

Further, in an event of a fault, the sudden reduction of the voltage at the point of interconnection of the generator and the power grid may result in a sudden reduction of the electrical power output of the generator. As a consequence, the unbalance between the electrical power output of the generator and the mechanical power input from the engine may cause the acceleration of the generator, which may lead to loss of synchronism between the generator and the rest of the grid. Thus, certain types of generators with small inertia may accelerate rapidly and lose synchronism during fault events. In a non-limiting example, certain types of generators include small synchronous or asynchronous generators.

In the past, under these inadvertent fault and large power disturbance circumstances, it has been acceptable and desirable for small generators to trip off line whenever the voltage reduction occurs. Operating in this way has no real detrimental effect on the stability of the power grid when the total power provided to the grid from these small generators is very small compared to the total power provided to the grid by all other power generating units. However, as penetration of small distributed generators in the grid and the amount of power provided to the grid by these small distributed generators increases, the stability of the electric grid may be jeopardized if all such generators are disconnected during a fault event with low voltage conditions. It is therefore desirable for these generators to remain synchronized to the grid, to ride through low voltage conditions, and to be able to feed electric power into the grid immediately after the fault is cleared. Therefore, emerging grid codes are increasingly requiring small generators to "ride through" certain voltage conditions caused by grid fault events. This, however, currently represents a big challenge for generators with small inertia, which tend to rapidly accelerate after a "voltage dip."

Various techniques may be employed to overcome the issue of rapid acceleration in power generators during fault conditions. One such technique is to provide a mechanical braking to halt a prime mover in the power generator. However, the mechanical braking units have a relatively slow reaction time and are therefore inadequate for small generators with small inertia, which could lose synchronism even before the mechanical braking is applied. Another technique is to increase the inertia of the generator, for example by adding a flywheel, to reduce the generator acceleration during low voltage conditions. This technique results in reducing the dynamic performance of the generator with additional weight and cost. An alternative technique is to provide an electrical braking with a braking resistor to dissipate power in the resistor in order to halt the acceleration of the power generator during fault conditions. However, most of the electrical brake techniques include expensive power electronics that substantially increases the cost of the system.

Hence, there is a need for an improved system and method for an effective and inexpensive Fault Ride Through (FRT) power generation system to address one or more aforementioned issues.

BRIEF DESCRIPTION

In accordance with one embodiment described herein, an electromagnetic braking system comprises: an electrically conductive disc coupled to a rotatable shaft of a power generation system, wherein the rotatable shaft is operatively coupled between a prime mover and a generator; a controller for receiving at least one status signal from the power generation system and for generating a control signal based on the at least one status signal; and an inducting unit for applying an electromagnetic braking force on the electrically conductive disc when commanded by the control signal to regulate a rotational speed of the rotatable shaft.

In accordance with another embodiment described herein, a method comprises: receiving at least one status signal representative of a rotational speed of a rotatable shaft, a voltage in the power grid, a current at the power generator, a mechanical power produced by a prime mover, a rotor angle of the power generator, an electrical power produced by the power generator or combinations thereof; determining a control signal based on the at least one status signal; and applying an electromagnetic braking force on the rotatable shaft when commanded by the control signal to regulate the rotational speed of the rotatable shaft.

In accordance with another embodiment described herein, a power generation system comprises: a prime mover for creating mechanical power; a generator operatively coupled to the prime mover through a rotatable shaft for generating electrical current based on the mechanical power and supplying the electrical current to a power grid; and an electromagnetic braking unit operatively coupled to the rotatable shaft for regulating a rotational speed of the rotatable shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of an exemplary electromagnetic braking system in a power generation system and methods for maintaining synchronism between a power generator and a power grid in the power generation system are presented. By employing the methods and the various embodiments of the electromagnetic braking system described hereinafter, LVRT (low voltage ride through) or FRT (Fault ride through) capabilities are provided to the power generation system at a very low cost.

Figure 1:
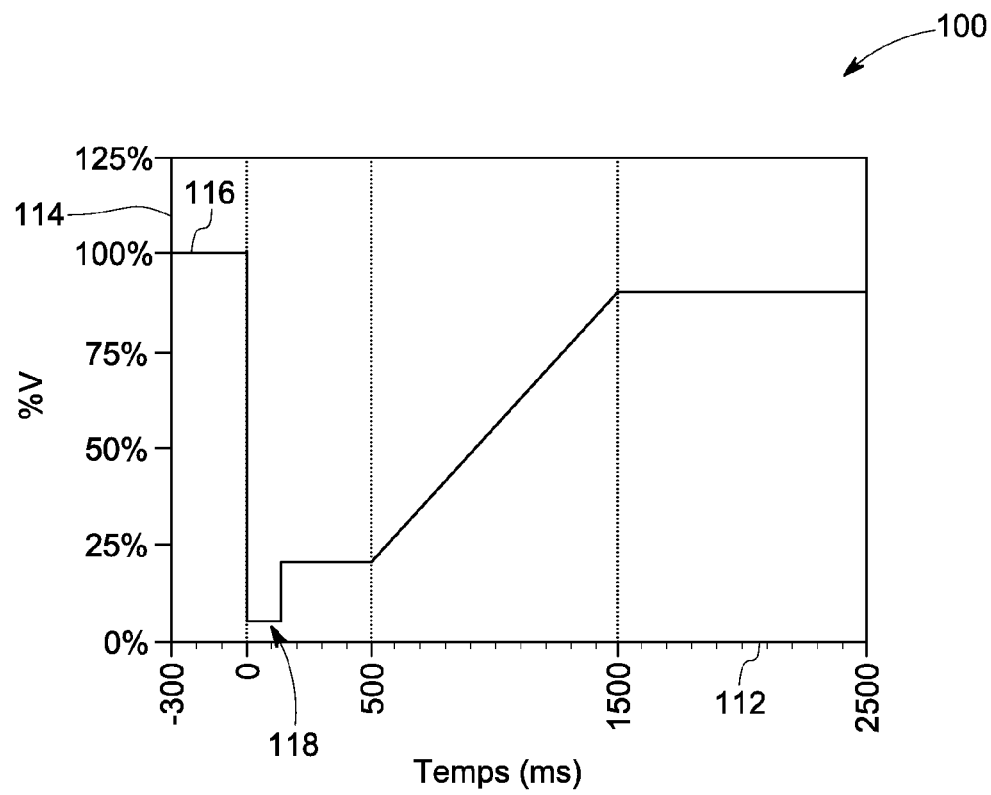
FIG. 1 is a plot of a grid code defined voltage profile illustrating the depth of the voltage dip and the clearance time.

FIG. 1 illustrates a plot 100 of an example of a voltage limit curve at the point of connection (POC) of a power generation system during a fault event. The power generation system is required by the grid code to ride through such a fault event without disconnecting. According to the grid code requirements, grid authorities expect generators to stay connected when a voltage dip of a certain magnitude and duration occurs at the POC. The grid code requirements are aimed in preventing the sudden disconnection of great number of generators, which may contribute to the voltage dip and have negative impact on system stability. The grid code therefore requires that all generators to stay connected to the power grid as long as the voltage at the POC is equal or higher than the voltage limit curve shown. However, this is one exemplary case, and the voltage limit curve shape may vary from country to country or from one grid authority to other grid authority. In one example, the faults may be due to lightning and wind storms. These faults may cause a "voltage dip" of a certain magnitude and duration, depending on the type and severity of the fault and the distance of the fault from the POC.

Further, the plot 100 shows a horizontal axis 112 representing time in milliseconds and a vertical axis 114 representing voltage in percentage. The fault occurs at 0 milliseconds. Before the fault, the system is in normal condition, so the pre-fault voltage 116 at POC i.e., before 0 millisecond is 100% or 1 per unit. When the fault event occurs, the voltage 118 at 0 millisecond may drop by 95% down to as low as 5% at the beginning of the fault. Typically, the generator is required to stay connected with the power grid even when the voltage drops to as low as 5%. It should be noted that the voltage at the POC depends on the electrical distance of the fault from POC, the type and severity of the fault, and so forth. In one embodiment, the voltage drop may be less than 95%. In another embodiment, the voltage drop may be as high as 100% in the case of a zero impedance fault at the POC.

When the voltage at POC falls due to certain fault events, as illustrated in FIG. 1, it is likely that the amount of electrical power injected by the generator into the grid is reduced. At the same time, if the mechanical power produced by the prime mover is not reduced, the mechanical power delivered to the generator by the prime mover becomes larger than the electrical power injected by the generator into the grid. The difference in the mechanical power delivered to the generator and the electrical power taken out from the generator is transformed to kinetic energy accelerating the rotating masses of engine and generator. This in turn increases the speed of the rotor above synchronous speed, which results in the increase of the generator rotor angle. The increase in rotor angle would eventually lead to loss of synchronism between the generator and the grid. Also, the generator may trip and may not fulfill the required grid code. This could be avoided by reducing the rotor speed to, or below, a synchronous speed or a threshold speed, and therewith stopping the rotor angle to increase before synchronism is lost and bringing the power generation system back to a stable operating point. The reduction in rotor speed requires decelerating the rotating masses on time. In the example of the grid code voltage profile, the fault event duration is shown as 150 ms. At 150 ms, the fault is cleared or one of the zone protections is activated, thus the voltage goes up to 20%. Further at 500 ms, other zone protections are activated and the voltage returns to 90% within 1500 ms.

Figure 2:
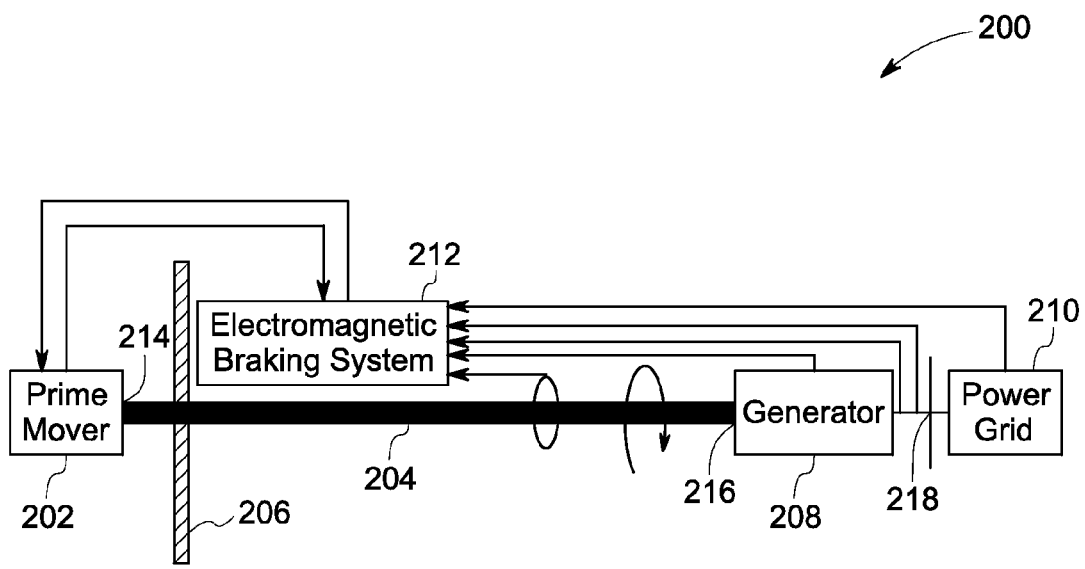
FIG. 2 is a diagrammatical representation of a power generation system utilizing an electromagnetic braking system, in accordance with aspects of the present disclosure.

Referring to FIG. 2, a power generation system 200 having an electromagnetic braking unit 212, in accordance with aspects of the present disclosure, is depicted. The power generation system 200 is typically used to convert mechanical power into electrical power. For example, in a wind system, the kinetic energy of wind passing across a wind turbine is converted into mechanical power. This converted mechanical power is in turn used to generate electrical power.

In the embodiment of FIG. 2, the power generation system 200 includes a prime mover 202, a rotatable shaft 204, an electrically conductive disc 206, a generator 208, and an electromagnetic braking unit 212. The generator 208 provides electrical power to a power grid 210. The prime mover 202 may be configured to create mechanical power. The prime mover 202 typically includes a rotor (not shown) such as the wind turbine, a gas turbine, a gas engine, or a diesel engine. Further, the prime mover 202 is mechanically coupled to the power generator 208 through the rotatable shaft 204. In one example, the rotatable shaft 204 includes a first end 214 and a second end 216. The first end 214 of the rotatable shaft 204 is coupled to the prime mover 202, while the second end 216 of the rotatable shaft 204 is coupled to a rotor of the generator 208. Also, in one embodiment, the rotatable shaft 204 may include one or more gear boxes (not shown). The rotatable shaft 204 is typically used to convey the mechanical power from the prime mover 202 to the power generator 208. For example, the mechanical power produced at the prime mover 202 may be used to rotate the rotatable shaft 204 at a predetermined speed. This rotation of the rotatable shaft 204 in turn rotates the rotor of the generator 208 to generate electrical power. In one embodiment, the generator 208 may include a three-phase generator.

Furthermore, the generated electrical power at the generator 208 is transferred to the power grid 210. It is to be noted that a connection point 218 of the generator 208 and the power grid 210 is referred to as the point of connection (POC). In some embodiments, the generator 208 may be coupled to the power grid 210 through a power electronic converter (not shown), and in other embodiments the generator 208 may be coupled to the power grid 210 without any power electronic converter. In another embodiment, the generator 208 may be coupled to the power grid 210 through a transformer (not shown) with or without power electronics. The power grid 210 collects the power generated from one or more generators and transmits the collected power to different locations for one or more applications.

In the exemplary embodiment of FIG. 2, the electrically conductive disc 206 is rigidly coupled to the rotatable shaft 204. The conducing material used for the electrically conductive disc 206 may include, but is not limited to copper, aluminum and/or steel. Typically, different materials provide different torque-speed characteristics, so a further degree of freedom is available to those skilled in the art to achieve the required braking capability. The electrically conductive disc 206 may be a small and light disc that has almost no effect or negligible effect on the inertia of the generator 208. In one exemplary embodiment, the electrically conductive disc 206 may have a thickness of about 1.5 cm and an outer diameter of about 90 cm to provide a torque capability of about 14 kNm under rated current supply. It is to be noted that the dimensions of the electrically conductive disc 206 may vary depending on the type of application, and thus, they should not be intended as limited to the exemplary ones. Since the electrically conductive disc 206 is rigidly coupled to the rotatable shaft 204, the rotational speed of the rotatable shaft 204 may be controlled by controlling the rotational speed of the electrically conductive disc 206.

During an operation of the power generation system 200, the voltage at the POC 218 may fall below a predetermined level, as depicted in FIG. 1, due to one or more fault events in the system 200. When such a voltage fall/drop occurs in the system 200, it is likely that the electrical power injected to the grid 210 by the generator 208 is reduced. If the mechanical power produced by the prime mover 202 is not reduced accordingly, then the mechanical power surplus is transformed into kinetic energy accelerating the rotating masses of the engine/prime mover 202 and the generator 208. Consequently, the rotor speed of the generator 208 may increase, resulting in increase of the generator rotor angle, which may lead to loss of synchronism between the generator 208 and the power grid 210. Therefore, the generator 208 will trip and fail to comply with the required grid code.

To address these shortcomings/problems, the electromagnetic braking unit 212 is employed to help the power generation system 200 to regulate the rotational speed of the rotatable shaft 204. Further, by regulating the rotational speed of the rotatable shaft 204, the electromagnetic braking unit 212 may maintain synchronism between the generator 208 and the power grid 210. Particularly, the electromagnetic braking unit 212 receives at least one status signal from the power generation system 200. The status signal may be representative of a rotational speed of the rotatable shaft 204, a voltage in the power grid 210, a current at the generator 208, a mechanical power produced by the prime mover 202, a rotor angle of the generator 208, an electrical power produced by the generator 208, or combinations thereof. The rotor angle of the generator 208 is defined as an electrical angle between a stator voltage of the generator 208 and a voltage of the power grid 210. Also, this status signal may indicate one or more fault events/conditions in the power generation system 200.

Further, the electromagnetic braking unit 212 may generate a control signal based on the received status signal. This generated control signal is used to apply electromagnetic braking force on the rotatable shaft 204 to regulate the rotational speed of the rotatable shaft 204, which in turn prevents loss of synchronism between the generator 208 and the power grid 210. The aspect of maintaining synchronism between the generator 208 and the power grid 210 will be explained in greater detail with reference to FIGS. 3 and 4. Thus, by employing the electromagnetic braking unit 212, the rotational speed of the rotatable shaft 204 is controlled and the synchronism between the generator 208 and the power grid 210 is maintained. This in turn helps the power generation system 200 to comply with the required grid code including the LVRT grid code.

Figure 3:
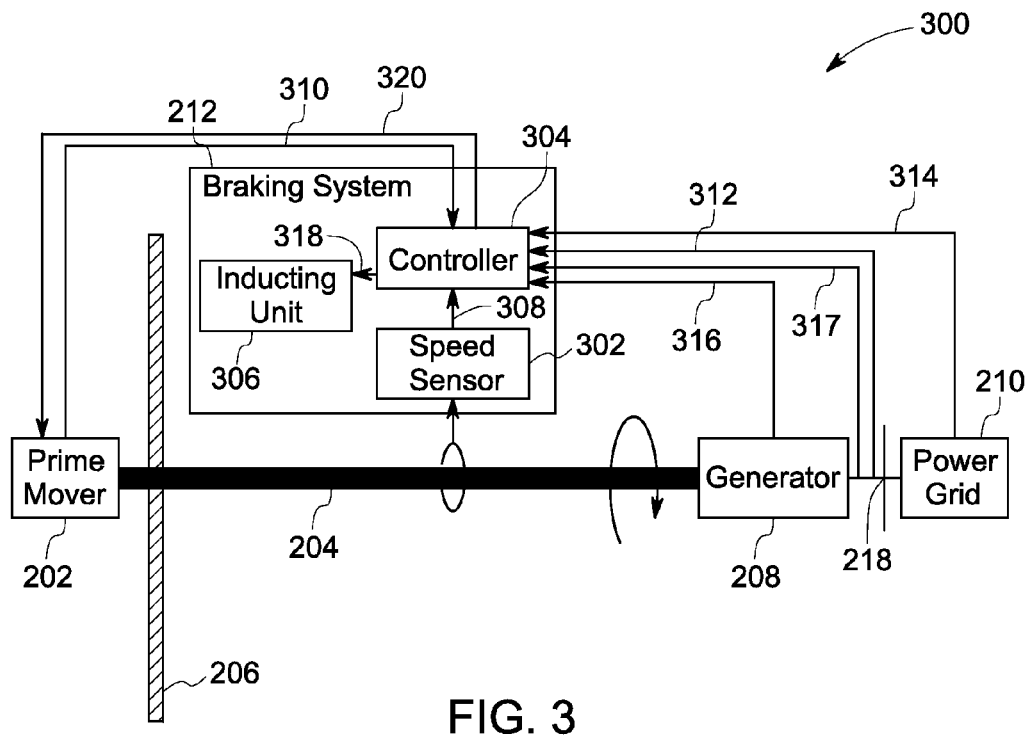
FIG. 3 is a diagrammatical representation of a detailed electromagnetic braking system, in accordance with aspects of the present disclosure.

Referring to FIG. 3, a diagrammatical representation of a detailed electromagnetic braking unit implemented in a power generation system 300, in accordance with aspects of the present disclosure, is depicted. The electromagnetic braking unit 212 includes a speed sensor 302, a controller 304, and an inducting unit 306. In one embodiment, the speed sensor 302 is electrically coupled to the rotatable shaft 204 to determine the rotational speed of the rotatable shaft 204. Particularly, the speed sensor 302 sends a speed signal 308 that is representative of the rotational speed of the rotatable shaft 204 to the controller 304. In addition to the speed signal, the controller 304 may also receive at least one status signal from the components, such as the prime mover 202, the generator 208, and the power grid 210 of the power generation system 300. This status signal may be representative of a mechanical power produced by the prime mover 202, a current generated by the generator 208, a voltage in the power grid 210, a rotor angle of the generator 208, an electrical power produced by the generator 208, or combinations thereof.

In the exemplary embodiment of FIG. 3, the controller 304 may receive the status signal that includes at least the speed signal 308, a power signal 310, 317, a current signal 312, a voltage signal 314, a rotor signal 316, or combinations thereof.

In a more specific embodiment, the controller 304 receives the voltage signal 314 from the power grid 210. The voltage signal 314 may be representative of one or more fault events occurring in the power grid 210. In one example, the voltage signal 314 may indicate a fault voltage at the POC or the power grid 210, as depicted in FIG. 1. In one embodiment, one or more voltage sensors (not shown) may be employed in the power grid 210 to determine the voltage signal 314.

Alternatively or additionally, the controller 304 may receive the current signal 312 from the generator 208. The current signal 312 may be representative of the current generated by the generator 208. Also, the current signal 312 may indicate whether the current at the generator 208 is above or below a threshold current. In one embodiment, one or more current sensors (not shown) may be disposed on the generator 208 or at an output terminal of the generator 208 to determine the current signal 312.

Alternatively or additionally, the controller 304 may receive the rotor signal 316 from the generator 208. The rotor signal 316 may be representative of the rotor angle of the generator 208. The rotor angle may be measured by integration of varying speed of the shaft 204 and predetermined synchronous speed. More specifically, the rotor angle may indicate an electrical angle between the stator voltage of the generator 208 and the voltage in the power grid 210. In one embodiment, one or more sensors (not shown) may be employed in the generator 208 and/or power grid 210 to determine the rotor signal 316. In another embodiment, the sensors that are used to determine the current signal 312 may also be used to determine the rotor signal 316.

Alternatively or additionally, the controller 304 may receive a power signal 310 from the prime mover 202 of the power generation system 300. The power signal 310 may be representative of the mechanical power produced by the prime mover 202. Also, the power signal 310 may indicate whether the produced mechanical power is above or below a first threshold power. In one embodiment, one or more power sensors (not shown) may be used in the prime mover 202 to determine the power signal 310.

Alternatively or additionally, the controller 304 may receive the electrical power signal 317 from the POC 218. The electrical power signal 317 may be representative of the electrical power produced by the generator 208. Also, the power signal 310 may indicate whether the produced electrical power is above or below a second threshold power. In one embodiment, the controller 304 may determine the electrical power based on the voltage and the current generated by the generator 208.

Upon receiving one or more of these signals 308, 310, 312, 314, 316, 317 from the power generation system 300, the controller 304 may generate a control signal 318 to initiate and/or regulate the electromagnetic braking force/power on the rotatable shaft 204. In one embodiment, the amount of electromagnetic braking force applied on the rotatable shaft 204 is proportional to the magnitude of the control signal 318. In the exemplary embodiment, the control signal 318 may be generated based on one of these signals 308, 310, 312, 314, 316, 317 or a combination of these signals 308, 310, 312, 314, 316, 317.

In one embodiment, the controller 304 may determine whether a fault event has occurred in the power grid 210 based on the received voltage signal 314. If so, the controller 304 generates the control signal 318 that is corresponding to the fault event of the power grid 210. The voltage signal 314 may indicate the fault event in the power grid 210.

In another embodiment, the controller 304 may determine whether the rotational speed of the rotatable shaft 204 is above the threshold speed based on the received speed signal 308. If so, the controller 304 generates the control signal 318 that is corresponding to the rotational speed of the rotatable shaft 204. Also, the controller 304 may generate the control signal 318 that is corresponding to the change in the rotational speed of the rotatable shaft 204. For example, if the rotational speed of the shaft 204 is 1510 rpm and the threshold speed is 1500 rpm, the control signal 318 is generated to reduce the rotational speed by 10 rpm.

In yet another embodiment, the controller 304 may determine whether the mechanical power that is produced by the prime mover 202 is above the first threshold power based on the received power signal 310. If so, the controller 304 may generate the control signal 318 that is corresponding to the mechanical power produced by the prime mover 202. Also, the controller 304 may generate the control signal 318 that is corresponding to the amount of mechanical power that is above the first threshold power. In this embodiment, the generated control signal 318 may be used to apply the braking on the electrically conductive disc 206 to reduce the rotational speed of the shaft 204.

In a similar manner, the controller 304 may determine whether the mechanical power that is produced by the prime mover 202 is below the first threshold power based on the received power signal 310. If so, the controller 304 may generate the control signal 318 that is corresponding to the mechanical power produced by the prime mover 202. In this embodiment, the generated control signal 318 may be used to remove the braking force that is acting on the electrically conductive disc 206. In one embodiment, the electrical power signal 317 may be used as the first threshold power for determining the control signal 318.

In another embodiment, the controller 304 may determine whether the electrical power that is produced by the generator 208 is below a second threshold electrical power based on the received electrical power signal 317. If so, the controller 304 may generate the control signal 318 that is corresponding to the electrical power produced by the generator 208. Also, the controller 304 may generate the control signal 318 that is corresponding to the amount of electrical power that is below the second threshold electrical power. In this embodiment, the generated control signal 318 may be used to apply the braking on the electrically conductive disc 206 to reduce the rotational speed of the shaft 204. In one embodiment, the power signal 310 received from the prime mover 202 may be used as the second threshold electrical power for determining the control signal 318.

In one more embodiment, the controller 304 may determine whether the current at the generator 208 is above the threshold current based on the received current signal 312. If so, the controller 304 may generate the control signal 318 that is corresponding to the current at the generator 208. Also, the controller 304 may generate the control signal 318 that is corresponding to the amount of current above the threshold current.

In another embodiment, the controller 304 may determine whether the rotor angle of the generator 208 is above a threshold rotor angle based on the received rotor signal 316. If so, the controller 302 may generate the control signal 318 that is corresponding to the rotor angle of the generator 208.

Furthermore, in yet another embodiment, the controller 304 may generate the control signal 318 based on some combination of the signals 308, 310, 312, 314, 316, 317 received from the power generation system 300. In one example, the controller 304 may generate the control signal 318 only if each of the following conditions is present: the voltage in the power grid 210 is below a threshold voltage, the generator current is above a threshold current, and the rotational speed of the shaft 204 is above a threshold speed. Otherwise, the controller 318 may ignore these received signals 308, 310, 312, 314, 316, and no control signal 318 is generated. In another example of a combination approach, the controller 304 may generate the control signal 318 if the voltage at the power grid is 50% below a normal voltage and the generator current is 10% above a normal current. It is to be noted that the normal voltage and the normal current are referred to their respective voltage and current in the system 300 during normal conditions when no fault events/conditions occurred in the system 300.

In one embodiment, the controller may additionally generate a control signal 320 based on one or more of the signals 308, 310, 312, 314, 316, 317 received from the power generation system 300. The control signal 320 is provided to the prime mover 202 to control or regulate the generation of mechanical power for a determined time period. In one example, if a fault is detected in the power generation system, e.g., fault voltage in the power grid 210, the controller 304 may send the control signal 320 to stop or regulate the generation of mechanical power at the prime mover 202 for the determined time period. Further, once the fault is cleared or the fault is continued for a maximum interruption time period of the prime mover 202, the controller 304 may send another control signal to the prime mover 202 to resume generating the mechanical power and to quickly recover the full mechanical power. By additionally controlling the power generation at the prime mover 202, the size and braking capability of the braking system 212 and related power electronics and power source may be substantially reduced.

Upon determining the control signal 318, the controller 304 may be configured to drive the inducting unit 306 to initiate and/or regulate the electromagnetic braking force on the electrically conductive disc 206. In one embodiment, the electromagnetic braking force is regulated or varied depending upon the magnitude of control signal 318 provided by the controller 304. Also, in one or more instances, the controller 304 may drive the inducting unit 306 to remove the electromagnetic braking force that is applied on the electrically conductive disc 206. For example, as previously noted, if the mechanical power of the prime mover 202 is below the first threshold power and the load angle of the generator is below a threshold limit or, more generally, the fault event has been cleared, the control signal 318 may be provided to the inducting units 306 to stop or remove the electromagnetic braking force that is acting on the electrically conductive disc 206. In this case, the controller 304 is determining in advance that the rotational speed of the shaft 204 may go down due to the drop in the mechanical power of the prime mover 202. Thus, by removing the electromagnetic braking force on the electrically conductive disc 206, the power generation system 300 may have additional time to maintain synchronism between the generator 208 and the grid 210.

In the embodiment of FIG. 3, the inducting unit 306 is communicatively coupled to the controller 304 to receive the control signal 318 and apply the electromagnetic force based on the control signal 318. Particularly, the inducting unit 306 creates a first magnetic field across the electrically conductive disc 206. In one embodiment, this first magnetic field is corresponding to the magnitude of the received control signal 318.

Furthermore, the electrically conductive disc 206 that is coupled to the rotatable shaft 204 rotates through this created first magnetic field. More specifically, the amplitude and/or direction of the first magnetic field may be varied while the electrically conductive disc 206 is rotating along the rotatable shaft 204. As a result of these variations in the first magnetic field that is linked to each portion of the electrically conductive disc 206, eddy currents are induced in the electrically conductive disc 206. These induced eddy currents may further create a second magnetic field that is opposing the first magnetic field to resist rotation of the electrically conductive disc 206. By resisting the rotation of the electrically conductive disc 206, the rotational speed of the rotatable shaft 204 is controlled below the threshold speed to maintain synchronism between the power generator 208 and the power grid 210. In one example, if the rotational speed of the rotatable shaft 204 is above the threshold speed, the rotation of the electrically conductive disc 206 is resisted by the electromagnetic braking system 212 to maintain synchronism between the power generator 208 and the power grid 210. Also, while resisting the rotation of the electrically conductive disc 206, the accelerating power at the generator 208 may be dissipated as heat across the electrically conductive disc 206. The aspect of applying the electromagnetic force will be explained in greater detail with reference to FIG. 4. Thus, by applying and/or regulating the electromagnetic braking force, the rotational speed of the rotatable shaft 204 is regulated, which in turn helps the power generator 208 to maintain synchronism with the power grid 210 and comply with the grid code requirements.

Figure 4:
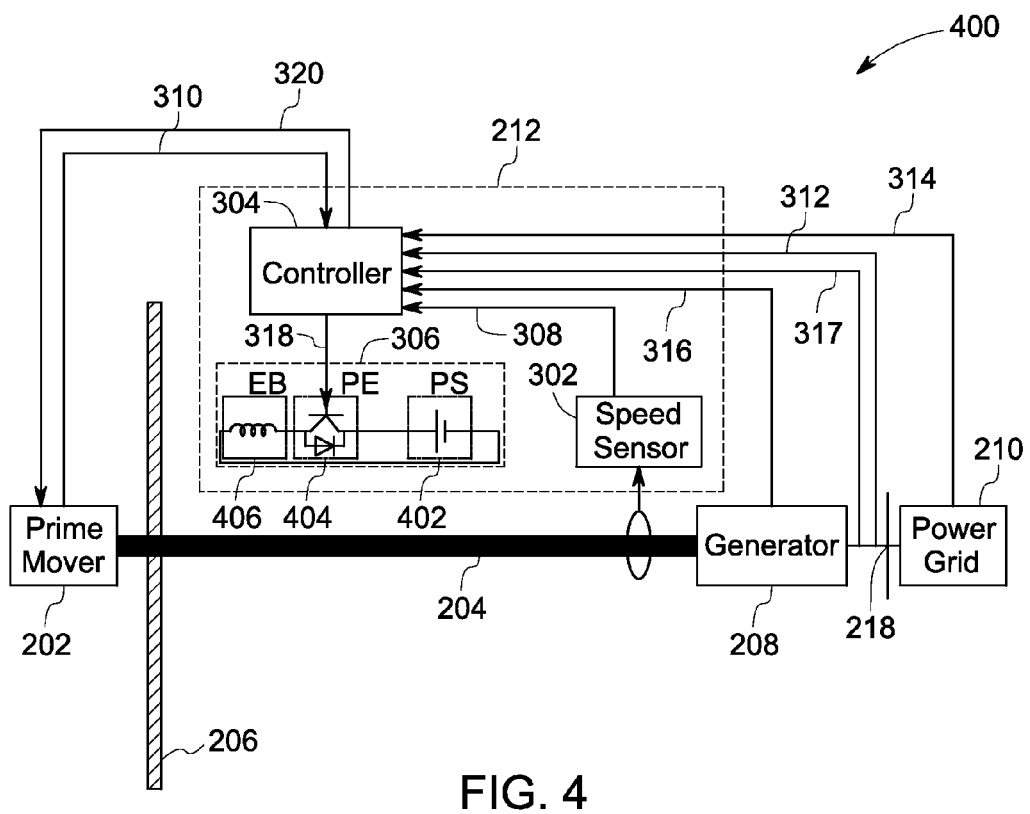
FIG. 4 is a diagrammatical representation of another detailed electromagnetic braking system, in accordance with aspects of the present disclosure.

FIG. 4 is a diagrammatical representation of another detailed electromagnetic braking unit in a power generation system 400 showing additional details of an embodiment wherein the inducting unit 306 includes a power source 402, an electrical switch 404, and inductors 406, in accordance with aspects of the present disclosure. The inductors 406 may include one or more electrical windings that are disposed proximate to the electrically conductive disc 206. "Proximate" as used herein means close enough to the electrically conductive disc that the described braking function can be achieved. In one non-limiting example, the inductors are situated about 5 mm from the electrically conductive disc. These windings are coupled to the power source 402 via the electrical switch 404 to receive alternating current (AC) or direct current (DC) current from the power source 402. In one embodiment, the inductors 406 may be arranged in one or more layers facing the electrically conductive disc 206. Also, the inductors 406 may be arranged in one or more groups facing either one side of the conductive disc 206 or both the sides of the conductive disc 206. Also, these groups of inductors 406 may be connected to a single electrical circuit or to a plurality of electrical circuits. In another embodiment, each of the groups of inductors 406 may be separately connected to a different electrical circuit, in parallel, to improve the response time of the braking action, and also to aim at better matching the groups of inductors 406 to the available switch 404 and the power source 402.

Furthermore, the electrical switch 404 is configured to regulate the AC or DC current that is provided from the power source 402 to the inductors 406. In one example, the electrical switch 404 may include an "Insulated-Gate-Bipolar-Transistor" (IGBT) switch that is controllable by the control signal 318 sent to a gate terminal of the switch. Particularly, the switch 404 toggles between ON state and OFF state depending upon the control signal 318 received from the controller 304. More specifically, the control signal 318 may include one or more pulses depending upon the amount of electromagnetic braking force required on the electrically conductive disc 206. If a positive pulse of the control signal 318 is provided to the gate terminal of the switch 404, the switch is turned to ON state. Similarly, if a negative pulse of the control signal 318 or no control signal 318 is provided to the gate terminal of the switch 404, the switch 404 is turned to OFF state. When the switch 404 is in the ON state, the AC or DC current is provided to the inductors 406, while the switch 404 is in the OFF state, no AC or DC current is provided to the inductors 406. Thus, depending upon on the sequence of pulses in the control signal 318, the electrical switch 404 regulates the AC or DC current received from the power source 402. For example, if the switch 404 is turned ON and OFF 100 times and the turn ON and OFF time period are same, the switch 404 provides 50% of the total current.

In accordance with aspects of the present disclosure, the inductors 406 create a first magnetic field across the electrically conductive disc 206 based on the received AC or DC current from the power source 402. The strength of the magnetic field is corresponding to the regulated AC or DC current received from the switch 404. This created first magnetic field further induces eddy currents in the electrically conductive disc 206. Particularly, the eddy currents are induced in the electrically conductive disc when the electrically conductive disc 206 rotates through the created first magnetic field. These induced eddy currents may further create a second magnetic field that is opposing the first magnetic field to resist rotation of the electrically conductive disc 206. By resisting the rotation of the electrically conductive disc 206, the rotational speed of the rotatable shaft 204 is controlled below the threshold speed to maintain synchronism between the power generator 208 and the power grid 210. Also, while resisting the rotation of the electrically conductive disc 206, the accelerating power at the generator 208 may be dissipated as heat across the electrically conductive disc 206. Thus, by applying the electromagnetic braking force, the power generator 208 maintains synchronism with the power grid 210, which in turn complies with the grid code requirements.

Figure 5:
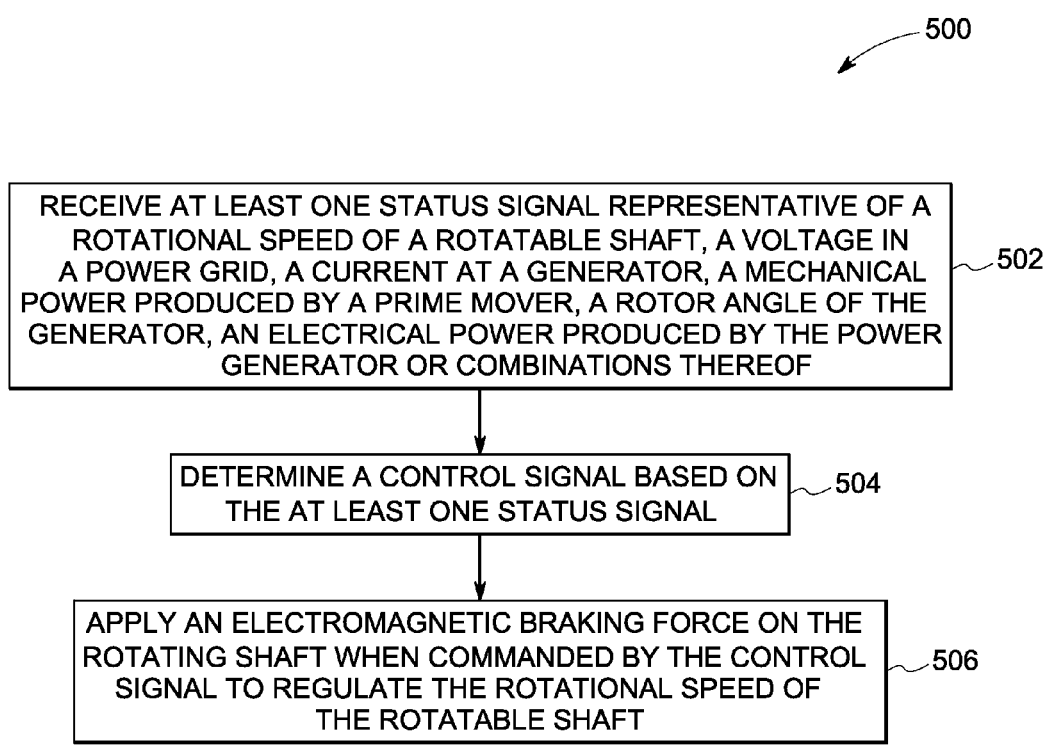
FIG. 5 is a flow chart illustrating a method for maintaining synchronism between a power generator and a power grid in the power generation system, in accordance with aspects of the present disclosure.

Referring to FIG. 5, a flow chart 500 illustrating a method for maintaining synchronism between a power generator and a power grid in a power generation system, in accordance with aspects of the present disclosure, is depicted. For ease of understanding of the present disclosure, the method is described with reference to the components of FIGS. 2-4. The method begins at step 502, where at least one status signal that is representative of a rotational speed of the rotatable shaft 204, a voltage in the power grid 210, a current at the generator 208, a mechanical power produced by the prime mover 202, a rotor angle of the generator 208, an electrical power from the generator or combinations thereof, is received from the power generation system 300. To that end, a controller 304 is configured to receive the status signal from the components, such as the prime mover 202, the generator 208, and the power grid 210 of the power generation system 300. Particularly, the controller 304 may receive the status signal that includes at least one of a voltage signal 314 from the power grid 210, a current signal 312 from the generator 208, a speed signal 308 from the rotatable shaft 204, a power signal 310 from the prime mover 202, a rotor signal 316 from the generator 208 and/or a power signal 317 from the generator. In the exemplary embodiment, the voltage signal 314 may indicate a fault voltage in the power grid 210. The speed signal 308 may indicate the rotational speed of the shaft 204, the current signal 312 indicate the current generated by the generator 208, the power signal 310 may indicate the mechanical power produced by the prime mover 202, the rotor signal 316 may indicate the rotor angle of the generator 208, and the power signal 317 may indicate the electrical power produced by the generator 208.

Additionally, at step 504, a control signal 318 is determined based on one or more of these received status signals 308, 310, 312, 314, 316, 317. In one example, the controller 304 determines whether the rotational speed of the rotatable shaft 204 is above a threshold speed from the received status signal. If so, the controller 304 generates the control signal 318 that is corresponding to the rotational speed of the rotatable shaft 204. In another example, the controller 304 may verify the status signal to detect any fault event in the power grid 210. If a fault event has occurred in the power grid 210, the controller 304 may determine the control signal 318 corresponding to the fault event. In one embodiment, if no fault event has occurred in the power grid 210, the controller 304 may verify the rotational speed of the rotatable shaft 204. If the rotational speed of the rotatable shaft 204 is above a threshold speed, the controller 304 may determine the control signal 318 that is proportional to the amount of rotational speed that is increased above the threshold speed. It is to be noted that the controller 304 may generate the control signal 318 based on any combination of the signals 308, 310, 312, 314, 316, 317 and is not limited to the above mentioned combination. Thereafter, the determined control signal 318 is provided to inductors 406 that are disposed proximate to an electrically conductive disc 206.

Further, at step 506, an electromagnetic braking force is applied on the rotatable shaft 204 when commanded by the control signal 318 to regulate the rotational speed of the rotatable shaft 204, which in turn helps to maintain synchronism between the power generator 208 and the power grid 210. To that end, the inducting unit 306 may apply the electromagnetic braking force on the rotatable shaft 204. Particularly, the inducting unit 306 may create a first magnetic field that is corresponding to the control signal 318 received from the controller 304. This first magnetic field further induces eddy currents in the electrically conductive disc 206 when the electrically conductive disc 206 rotates through the first magnetic field. The induced eddy currents in the electrically conductive disc 206 may create a second magnetic field around the electrically conductive disc 206. This created second magnetic field opposes the first magnetic field to resist the rotation of the electrically conductive disc 206. Thus, the electromagnetic braking force is applied on the rotatable shaft 204 via the electrically conductive disc 206 to maintain synchronism between the power generator 208 and the power grid 210.

Figure 6:
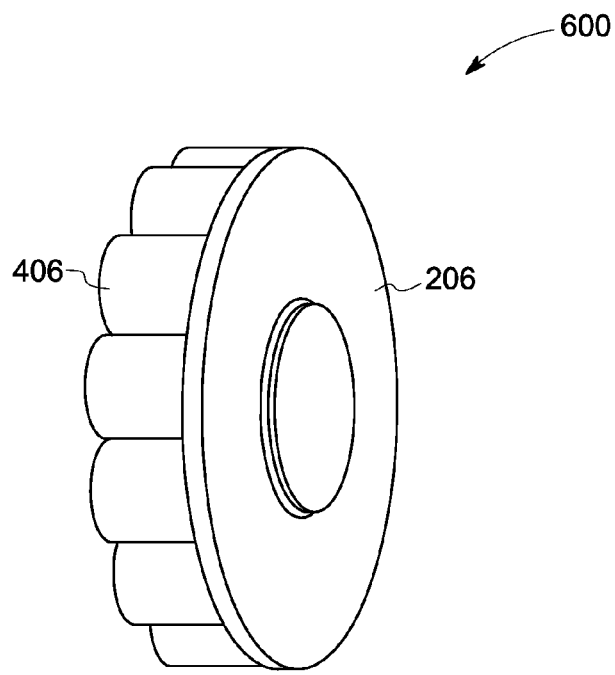
FIG. 6 is a diagrammatical representation of inductors on one side of an electrically conductive disc, in accordance with aspects of the present disclosure.

Referring to FIG. 6, a diagrammatical representation of inductors 406 arranged at one side of the electrically conductive disc 206, in accordance with aspects of the present disclosure is depicted. The inductors 406 may be arranged in one or more layers facing the electrically conductive disc 206. Also, in the embodiment of FIG. 6, the inductors 406 may be arranged in one or more groups facing one side of the electrically conductive disc 206. In one embodiment, a back iron disc (not shown) comprising magnetic steel for conducting magnetic flux may be coupled to the inductors 406 at a first side of the inductors 406 that is opposite to a second side facing the electrically conductive disc 206. Also, the inductors 406 and the back iron disc may be made of same piece of material and/or used as a single unit.

Figure 7:
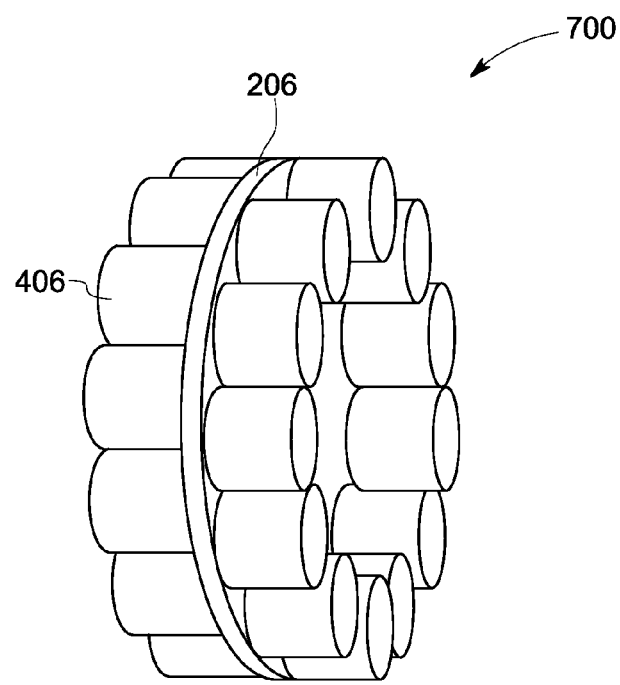
FIG. 7 is a diagrammatical representation of the inductors on both sides of the electrically conductive disc, in accordance with aspects of the present disclosure.

Further, in the embodiment of FIG. 7, the inductors 406 are arranged in one or more groups facing both the sides of the electrically conductive disc. In a similar manner as discussed with respect to FIG. 6, a back iron disc (not shown) may be coupled to the inductors 406 for conducting magnetic flux. Since the inductors 406 are arranged on both the sides of the electrically conductive disc, the amount of braking force applied on the electrically conductive disc may be significantly improved.

Figure 8:
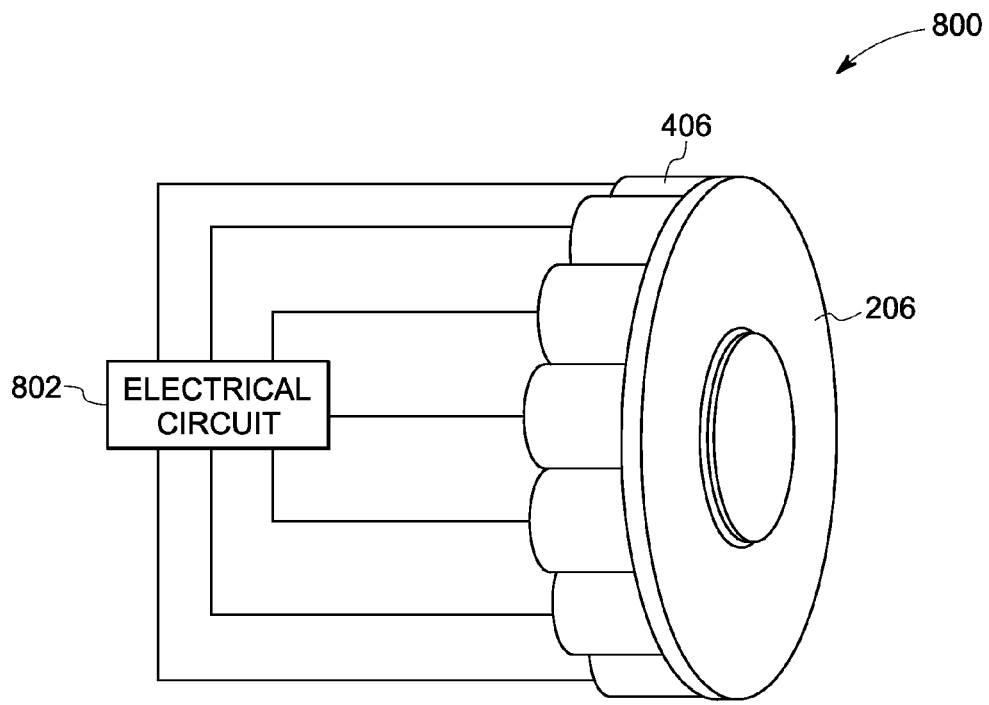
FIG. 8 is a diagrammatical representation of the inductors coupled to a single electrical circuit, in accordance with aspects of the present disclosure.

Also, the one or more groups of inductors 406 may be connected to a single electrical circuit 802, as depicted in FIG. 8. The electrical circuit 802 may include the components, such as the electrical switch 404 and the power source 402 of FIG. 4. As the inductors 406 are connected to one electrical circuit 802, the cost of power electronics in the electromagnetic braking system 212 may be substantially reduced.

Figure 9:
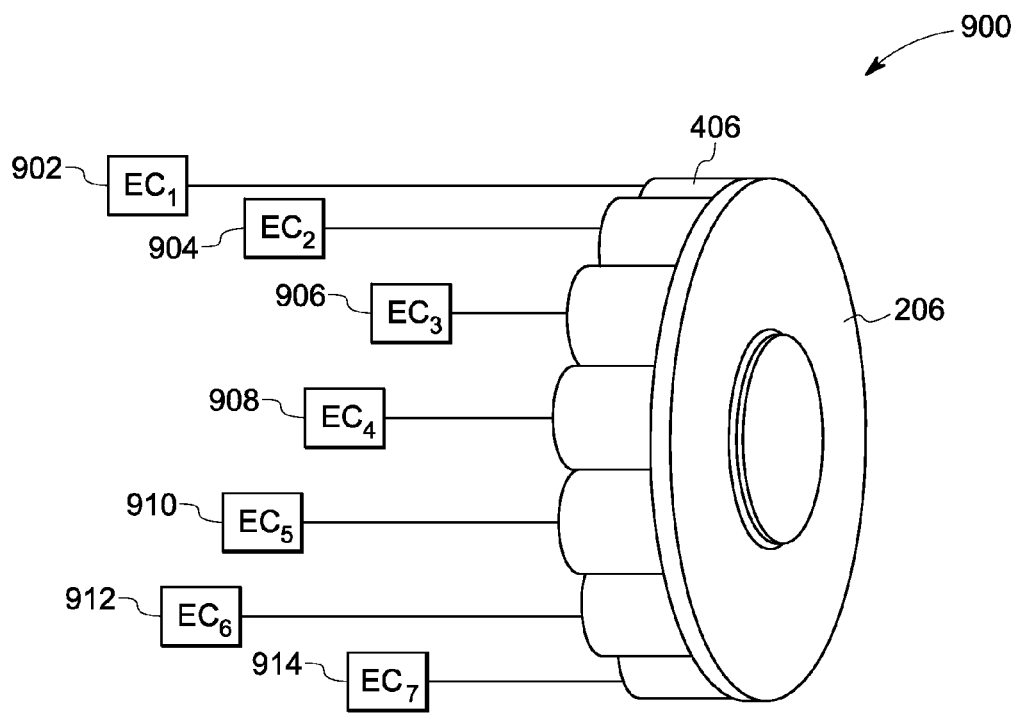
FIG. 9 is a diagrammatical representation of the inductors coupled to a plurality of electrical circuits, in accordance with aspects of the present disclosure.

Furthermore, in the embodiment of FIG. 9, the inductors 406 may be connected to a plurality of electrical circuits 902, 904, 906, 908, 910, 912, 914. Particularly, each of the groups of inductors 406 may be separately connected to a different electrical circuit, in parallel, to improve the response time of the braking action, and also to aim at better matching the groups of inductors 406 to the available switch 404 and the power source 402.

The various embodiments of the system and the method for synchronizing the power generator with the power grid aid in riding LVRT code at a very low cost. Also, the power electronics employed in the power generation system are very small in terms of power (e.g. less than 1 kW power needed for 1000 kW braking power) and therewith in terms of size and price. Additionally, small and light electrically conductive disc is employed that has almost no effect on the inertia of the generator, and hence, dynamic performance of the generator is improved. Moreover, the electromagnetic braking force is independent of the voltage conditions and grid strength.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   receiving status signals representative of a rotor angle of a power generator;
   determining whether the rotor angle of the power generator is above a threshold angle;
   if so, determining a control signal based only on the status signals representative of the rotor angle to maintain synchronism between the power generator and a power grid, and using the control signal for applying an electromagnetic braking power on a rotatable shaft to regulate the rotor angle of the power generator.

2. The method of claim 1, wherein applying the electromagnetic braking power on the rotatable shaft comprises:
   creating a first magnetic field across an electrically conductive disc coupled to the rotatable shaft;
   inducing eddy currents in the electrically conductive disc when the electrically conductive disc rotates through the first magnetic field; and
   using the induced eddy currents in the electrically conductive disc for creating a second magnetic field opposing the first magnetic field to resist rotation of the electrically conductive disc.

3. The method of claim 2, wherein creating the first magnetic field around the electrically conductive disc comprises sending at least one of an alternating current and a direct current to a plurality of inductors, wherein the at least one of the alternating current and the direct current is corresponding to the control signal.

* * * * *